(12) United States Patent
Symons et al.

(10) Patent No.: US 7,020,145 B1
(45) Date of Patent: Mar. 28, 2006

(54) NETWORK TOPOLOGY MANAGER

(75) Inventors: Julie Anna Symons, Santa Clara, CA (US); Sharad Singhal, Belmont, CA (US); Jerome Rolia, Kanata (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 09/963,338

(22) Filed: Sep. 24, 2001

(51) Int. Cl.
*H04L 12/28* (2006.01)

(52) U.S. Cl. .................................. 370/400; 709/221
(58) Field of Classification Search ................ 370/216, 370/217, 254, 352–357, 400; 709/220, 221, 709/223–225
See application file for complete search history.

(56) References Cited

U.S. PATENT DOCUMENTS

| | | | |
|---|---|---|---|
| 5,751,967 A | 5/1998 | Raab et al. | 395/200.58 |
| 5,764,911 A * | 6/1998 | Tezuka et al. | 709/223 |
| 6,047,320 A * | 4/2000 | Tezuka et al. | 709/223 |
| 6,061,334 A | 5/2000 | Berlovitch et al. | 370/255 |
| 6,075,776 A | 6/2000 | Tanimoto et al. | 370/254 |
| 6,085,238 A * | 7/2000 | Yuasa et al. | 709/223 |
| 6,421,719 B1 * | 7/2002 | Lewis et al. | 709/224 |
| 6,535,489 B1 * | 3/2003 | Merchant et al. | 370/244 |
| 6,535,491 B1 * | 3/2003 | Gai et al. | 370/256 |
| 6,678,241 B1 * | 1/2004 | Gai et al. | 370/216 |

FOREIGN PATENT DOCUMENTS

WO   WO 99/18751   4/1999

* cited by examiner

*Primary Examiner*—Hassan Kizou
*Assistant Examiner*—D Levitan (57) ABSTRACT

A network infrastructure, and methods for managing and configuring networks, are disclosed. The network infrastructure is physically wired once, and includes a plurality of interconnected switches and a plurality of devices coupled thereto, with each network interface on a device coupled to a single switch. Network traffic is forwarded between devices by programming intervening switches to enable a communication path between the devices. Traffic intended for a particular device is forwarded by the intervening switches only to that device. Traffic is only forwarded between devices for which a communication path has been enabled. The network configuration, the function of a device in a network application, or the position of the device in the network topology, can be changed by programming the switches to disable existing communication paths and/or enable new ones. Accordingly, networked resources are allocated as needed without changing the physical wiring of the network.

28 Claims, 9 Drawing Sheets

NETWORK TOPOLOGY MANAGER

TECHNICAL FIELD

The present invention relates to networks of devices. More specifically, the present invention pertains to a network infrastructure, and to methods for configuring and managing networks using that infrastructure.

BACKGROUND ART

Devices such as computer systems, and also including routers, hubs, load balancers, firewalls, and the like, are commonly linked to each other in networks. These networks provide a number of benefits, such as increased productivity, flexibility and convenience, as well as resource sharing and allocation.

Networks are configured in different ways depending on implementation-specific details such as the hardware used and the physical location of the equipment, and also depending on the particular objectives of the network. For example, applications often use local area networks (LANs) to partition devices into tiers with each tier having a different purpose and/or security properties.

One common type of network configuration includes a number of "virtual" networks. Virtual networks provide numerous advantages, a primary advantage being that the devices (e.g., computer systems) associated with a particular virtual network do not need to all be in the same physical location, yet all can appear to be on the same LAN.

There are many technologies that can be used to implement virtual networks. One such technology includes the IEEE 802.1Q standard and Ethernet switching fabrics. The IEEE 802.1Q standard defines a virtual network infrastructure based on virtual local area networks (VLANs). VLANs allow a network manager to logically segment a physical local area network into several virtual local area networks. To devices attached to the physical network, these VLANs appear as separate LANs. Switches on the physical network implement protocols, such as the Generic Attribute Registration Protocol (GARP), that permit arbitrary ports on the switches to participate in one or more of the VLANs (e.g., VLAN1, VLAN2, etc.).

VLANs have been used to create virtual network environments in business enterprises (e.g., offices and data centers). A network infrastructure can be separated into a number of VLANs to simplify the management and cabling of groups of devices. For example, devices within a workgroup can appear to be on the same LAN even though they are physically distributed over a geographic area. Furthermore, a device on VLAN1 that is moved to a new location can be connected to a switch port in the new location that is enabled for VLAN1. From the perspective of the device, the device remains on the same LAN.

LANs are commonly used to organize an application's devices into multiple tiers, such as a Web tier that interfaces with the Internet, an application tier that interfaces with the Web tier, and a database tier that interfaces with the application tier. The communication path (or LAN) between each of these tiers can be implemented as a separate VLAN. A key requirement is that these LANs be secure and isolated. For instance, a Web server may only be permitted to access application servers but not database servers. Typically, to satisfy the requirement for security, separate physical networks are used. For example, the Web and application servers share a physical LAN but there is no LAN between Web and database servers. The absence of the LAN isolates devices in the Web tier from devices in the database tier. Implementations of VLANs by many networking vendors do not diminish this level of isolation.

Providing adequate resources to these applications is problematic. To meet demand during peak periods, and to be able to respond rapidly to unanticipated increases in demand, the networks are often provisioned with extra equipment. The extra equipment increases costs and very often is under-utilized.

In addition, current network designs assume that the applications deployed on them will remain relatively stable over the lifetime of the network, and that changes in network configuration will therefore be needed only infrequently. This makes the task of adding resources or reconfiguring a network more difficult and time-consuming, typically requiring that the network be rewired to accommodate any changes. Changes in configuration are also expensive and prone to error, and may require intimate knowledge of the network as well as a relatively high level of expertise. In addition, changes to the network configuration likely cannot be made quickly enough to respond to rapid changes in demand seen by the applications. To avoid these problems, network designers generally fall back to the costly alternative of over-provisioning the resources on the network.

Accordingly, what is needed is a method and/or system that can overcome the need for rewiring networks when resources are added to the networks or when the networks are reconfigured. What is also needed is a method and/or system that can satisfy the above need and that can quickly allocate resources where they may be needed by multi-tier applications or other networked applications. The present invention provides a novel solution to the above needs.

DISCLOSURE OF THE INVENTION

The present invention provides a method and system that can overcome the need for rewiring networks when resources are added to the networks or when the networks are reconfigured. The present invention also provides a method and system that can quickly allocate resources where they may be needed based on application-level demands or to provide additional capacity in response to a resource failure.

The present invention pertains to a network infrastructure and to methods for managing and configuring a network using that infrastructure. The network includes a plurality of interconnected switches and a plurality of devices coupled thereto. In the present embodiment, each device may have multiple network interfaces, each of which is coupled to a single switch port. Conversely, a switch can have multiple switch ports, each of which is coupled to a single device interface.

According to the present invention, network traffic is permitted between devices by programming intervening switches to enable a communication path between the devices. Traffic intended for a particular device is forwarded by the intervening switches only to that device. In the present embodiment, traffic is only possible between devices for which a communication path has been enabled. In one embodiment, communication between switches occurs using a data-link layer protocol corresponding to Layer 2 of the Open Systems Interconnection (OSI) model.

Also according to the present invention, the switches can be configured to partition the devices into multiple local area networks (LANs). The network configuration can be dynamically changed by programming the switches to disable existing communication paths and/or enable new ones.

In one embodiment, these LANs are created according to virtual LAN (VLAN) technology. In one such embodiment, communication paths between devices are created substantially in compliance with IEEE 802.1Q or its equivalents. However, other VLAN technologies or Layer 2 protocols may be used with the present invention.

The function of a device in a network application, or the position of the device in the network topology, can be changed in a manner similar to that just described. Devices that play one role in the network, or that perform one function in a network application, can be moved to a different role or function by reconfiguring the network. Thus, there is no need to over-provision the network with extra devices to account for peak loads. Because the network configuration is changed by selectively programming existing switches, devices can be allocated as needed without changing the physical wiring of the network.

Thus, in accordance with the present invention, devices need only be physically wired once, avoiding the types of problems associated with rewiring networks. Still, the network can be dynamically configured and reconfigured into different network topologies depending on the application to be performed and the load placed on different parts of the network. Changes to the network can be implemented in software to decrease costs and reduce errors while increasing efficiency.

In one embodiment, decisions about which devices should be provisioned for a particular application are made based on service level objectives and/or on-going measurements of network/application performance. Thresholds based on the service level objectives can be put in place and network and application performance monitored against these thresholds. The service level objectives and on-going measurements for networks and/or applications are used to decide when a change in configuration would be beneficial. The network can be configured to improve application performance or availability or to decrease costs, depending on the service level objective.

The present invention thus provides a system and method for provisioning a network infrastructure and for modifying the infrastructure on demand. The infrastructure can be modified without having to shut down the physical network, making the virtual networks highly available. Devices can be added to or removed from the network at any time. The switches can be programmed to make traffic available exclusively to certain devices. Because the switches control traffic on every switch port and because devices do not otherwise share network segments, the infrastructure permits devices to be isolated from one another, ensuring security in the network.

These and other objects and advantages of the present invention will become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "actualizing," "enabling," "disabling," "configuring," "changing" or "programming" or "monitoring" or the like, refer to actions and processes (e.g., the processes of FIGS. 5A, 5B, 6A and 6B) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 1:
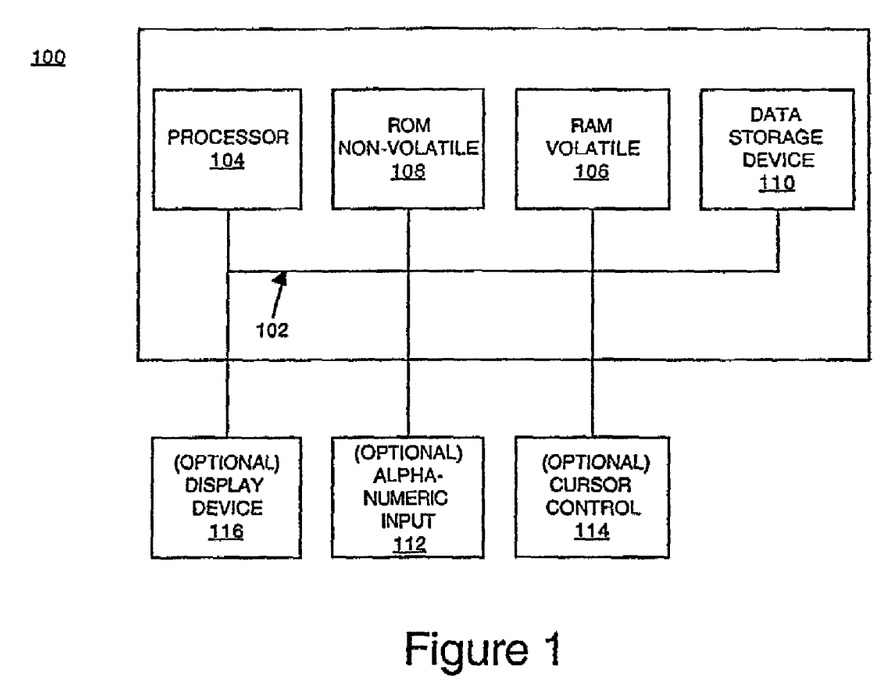
FIG. 1 is a block diagram of an exemplary computer system upon which embodiments of the present invention may be implemented.

With reference now to FIG. 1, portions of the present invention method and system are comprised of computer-readable and computer-executable instructions that reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like, or a remote device or terminal such as a Web browser.

System 100 of FIG. 1 includes an address/data bus 102 for communicating information, and a central processor unit 104 coupled to bus 102 for processing information and instructions. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1 may be a liquid crystal device, cathode ray tube, or other display device suitable for creating graphic images and alphanumeric characters recognizable to a user. Optional cursor control device 114 allows the computer user to dynamically signal the two-dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. Furthermore, it should be recognized that the function provided by display device 116, alphanumeric input device 112, and cursor control device 114 may be provided remotely using a remote terminal or Web browser to control computer system 100.

Figure 2:
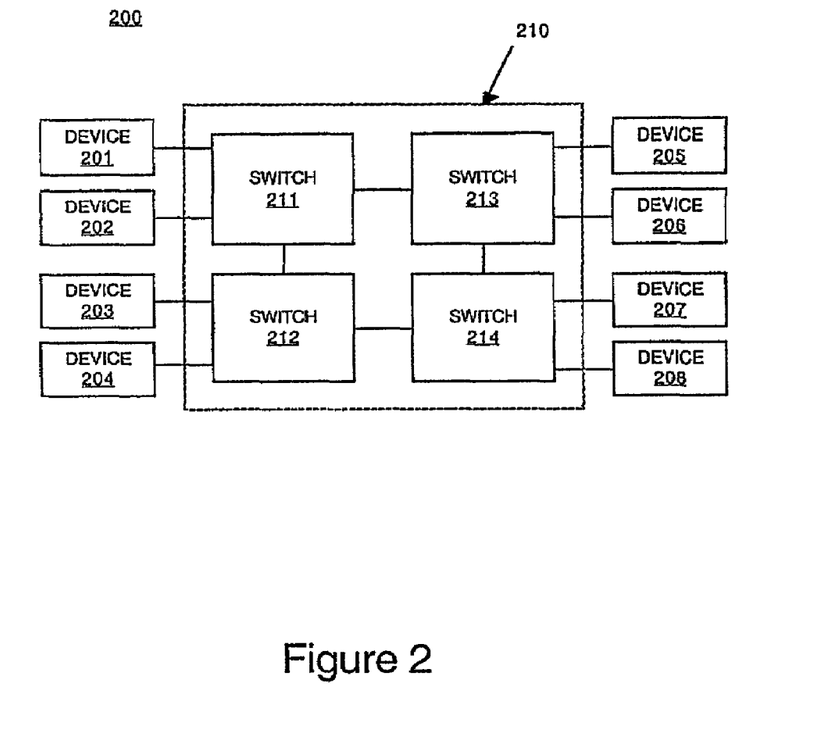
FIG. 2 is a block diagram of an exemplary network infrastructure in accordance with one embodiment of the present invention.

FIG. 2 is a block diagram of an exemplary network infrastructure 200 in accordance with one embodiment of the present invention. FIG. 2 shows eight (8) devices 201–208 coupled to a four (4) interconnected switches 211–214. Although 8 devices and 4 switches are shown, it is understood that any number of devices and switches may actually be used. It is also understood that any number of devices may be coupled to each switch, limited only by the number of switch ports provided by each switch. Additionally, if a device has multiple network interfaces, it may be connected to switch ports on one or more switches.

The devices 201–208 may be any type of host device, such as a computer system, or network resource, such as a router, hub, load balancer, firewall, storage device, or the like. The switches 211–214 may be any type of programmable device or network resource that supports virtual local area networks (VLANs) and switching functionality. In one embodiment, the switches 211–214 are VLAN switches or VLAN-enabled switches. Switches 211–214 incorporate mechanisms to ensure that only traffic authorized for a resource will appear on the switch ports to which that resource is connected. Switches providing this capability are well known in the art.

In this embodiment, each of the devices 201–208 is wired to a respective switch 211–214, with no shared network segments. That is, for example, the network interface on device 201 is wired to switch 211, as is the network interface on device 202. However, these devices are separately wired to switch 211, so that the network segments between these devices and the switch are not shared between devices. Thus, switches can control all of the network traffic visible to the devices to which the switches are coupled.

The switches 211–214 form what can be referred to as a switching fabric 210. Significantly, in the present embodiment, no other types of network resources or devices (e.g., routers, hubs, etc.) are provided inside the switching fabric 210. As mentioned above, if these devices are required by network 200, they are situated outside of and coupled to the switching fabric 210.

In accordance with the present invention, the switches 211–214 are programmed (enabled and disabled) to selectively forward network traffic through the switching fabric 210, and hence to selectively forward network traffic from one of the devices 201–208 coupled to the switching fabric 210 to another one of the devices coupled to the switching fabric 210. For example, a communication path between device 201 and device 208 is actualized by enabling the intervening switches (e.g., switches 211, 212 and 214) to forward network traffic from device 201 to device 208, and vice versa. The mechanisms for programming switches to accomplish this are known in the art. In the present embodiment, the switches communicate using a data-link layer protocol, corresponding to Layer 2 of the Open Systems Interconnection (OSI) model that is known in the art. Paths between these switches can be actualized using VLAN technology well known in the art.

Continuing with the above example, the actualized communication path between devices 201 and 208 is, in essence, a "virtual" wire linking the two devices. The network traffic between these two devices is controlled by the intervening switches 211, 212 and 214 by enabling the appropriate switch ports. Because the switches control all traffic on the switch ports, and because devices do not share the network segments linking them to the switches, network traffic sent from device 201 and intended for device 208 is visible only to device 208, and other devices cannot observe this traffic. Conversely, devices not communicatively coupled by an actualized communication path cannot communicate with each other. That is, if the intervening switches between devices are not enabled for certain devices, then those devices cannot communicate via the network 200.

Thus, one feature introduced with the present invention is finer control over what traffic is visible to each of the network devices 201–208. In other words, each device 201–208 "sees" only the network traffic for which it is the intended recipient. For example, the network traffic intended for device 201 is visible only to device 201 and is not visible to the other devices 202–208. In contrast, in conventional networks, network traffic can be visible to all of the devices, with each device claiming those instances of traffic for which it is the intended recipient and ignoring all other traffic.

In a manner similar to the above, local area networks (LANs) comprising multiple devices can be formed. For example, by enabling the appropriate switches (specifically, the appropriate switch ports), devices 201 and 205 can be partitioned into a first LAN, and other devices can be likewise partitioned into other LANs. The appropriate switches can also be enabled to control communication within LANs, and for those switches that act as routers, also between LANs, in a manner similar to that just described for controlling communication between devices. In one embodiment, connectivity between devices is tested using a conventional "heartbeat" or "ping" message or command.

The LANs formed in accordance with the present invention may be used to group devices according to a particular application to be performed. For example, the LANs may each represent a different tier in a multi-tiered organization, with one LAN representing a Web tier for interfacing with remote devices (e.g., customer devices connected to the Internet), another LAN representing an application tier and in communication with the Web tier, and another LAN representing a database tier in communication with the application tier. The intervening devices between the various LANs can be programmed to control communication between the tiers, allowing the Web tier to only communicate with the remote devices and the application tier, the application tier to only communicate with the Web tier and the database tier, and the database to only communicate with the application tier, for example. In this manner, the various LANs are isolated and network security is ensured.

As will be seen, another advantage provided by the present invention is that network 200 can be readily reconfigured by programming the switches 211–214 to enable new communication paths between the devices 201–208 and/or to disable existing ones. These changes can be accomplished in software to decrease the time, cost and risk of error relative to conventional means.

Figure 3A:
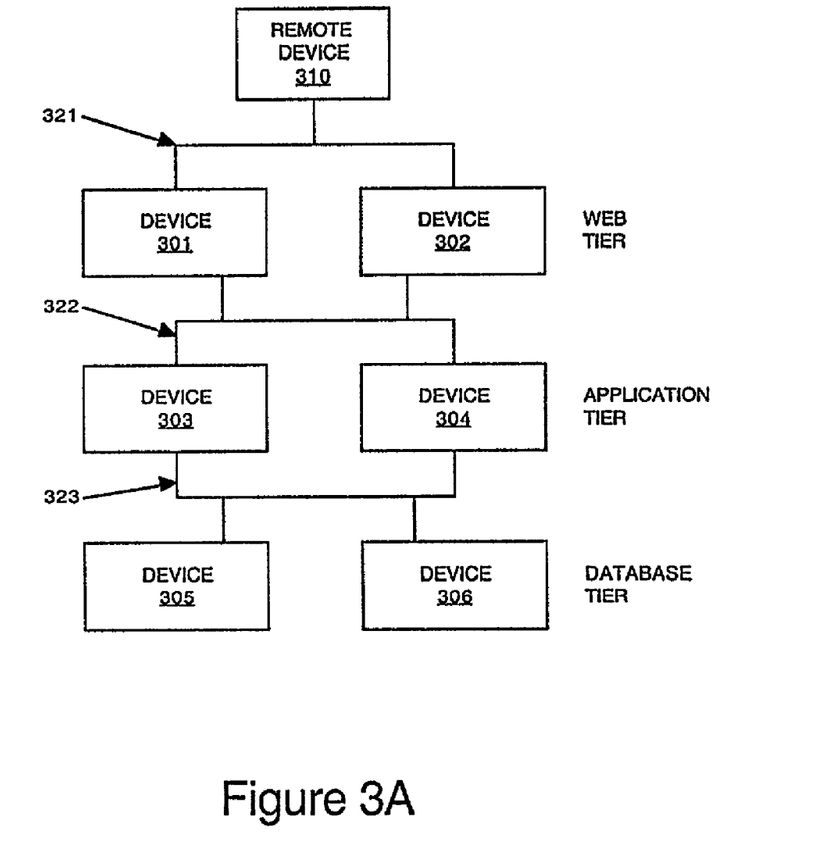
FIG. 3A is a block diagram of an exemplary network configuration for a multi-tiered application in accordance with one embodiment of the present invention.

FIG. 3A is a logical block diagram of an exemplary network configuration for a multi-tiered application in accordance with one embodiment of the present invention. Devices 301–306 may be any type of networked device, such as a computer system (e.g., a server or the like). In this embodiment, devices 301 and 302 are in a first (Web) tier, devices 303 and 304 are in a second (application) tier, and devices 305 and 306 are in a third (database) tier.

Remote device 310 is a device accessing the application; for example, remote device 310 may be a client device coupled conventionally to the Web tier over the Internet. It is appreciated that more or less than three tiers may be utilized with the present invention. It is also appreciated that, for example, by using additional VLANs, a load balancer, firewall, and/or other networking device may be placed between remote device 310 and devices 301 and 302, and/or between tiers. Furthermore, many remote devices may access the application rather than the single device 310 shown.

In accordance with the present invention, by enabling and disabling the appropriate switches coupled between the various devices, communication paths can be actualized between those devices that are allowed to communicate with each other. Although these switches are not illustrated in FIG. 3A, their presence is implied as illustrated by FIG. 2.

Continuing with reference to FIG. 3A, in the present embodiment, a communication path 321 (or first LAN) is actualized by enabling the switches coupled between devices 301 and 302, as well as remote device 310. Thus, devices 301, 302 and 310 can send and receive network traffic to one another via the intervening switches.

In addition, a communication path 322 (or second LAN) is actualized by enabling the switches between devices 301, 302, 303, and 304. These switches can be enabled on a device-by-device basis, and/or on a VLAN-by-VLAN basis. In the former case, for example, different physical network interfaces on each device are used for the different LANs. In the latter case, the devices recognized by the intervening switches as being connected to two LANs are allowed to communicate on two VLANs that represent the two LANs to the devices. In a similar manner, a communication path 323 (or third LAN) is actualized by enabling the switches between devices 303, 304, 305, and 306.

Significantly, in accordance with the present invention, remote device 310 can communicate with devices 301 and 302, but remote device 310 cannot communicate with the other devices 303–306 (that is, remote device 310 can communicate with devices on the first LAN, but not with devices on other LANs in the network). Similarly, devices 301 and 302 can communicate with each other (over path [or LAN] 321 and/or over path [or LAN] 322), with remote device 310 over path 321, and with devices 303 and 304 over path (or LAN) 322 (e.g., the second LAN), but not with devices 305 and 306 (e.g., the third LAN). Devices 303 and 304 can communicate with each other (over path [or LAN] 322 and/or over path [or LAN] 323), with devices 301 and 302 via actualized communication path (or LAN) 322, and with devices 305 and 306 via actualized communication path (or LAN) 323, but not with remote device 310; that is, the second tier can separately communicate with the first tier over path (or LAN) 322 and the third tier over path (or LAN) 323 only. Finally, devices 305 and 306 can communicate only with each other (over path [or LAN] 323) and with devices 303 and 304; that is, the third tier can only communicate with the second tier over path (or LAN) 323.

Figure 3B:
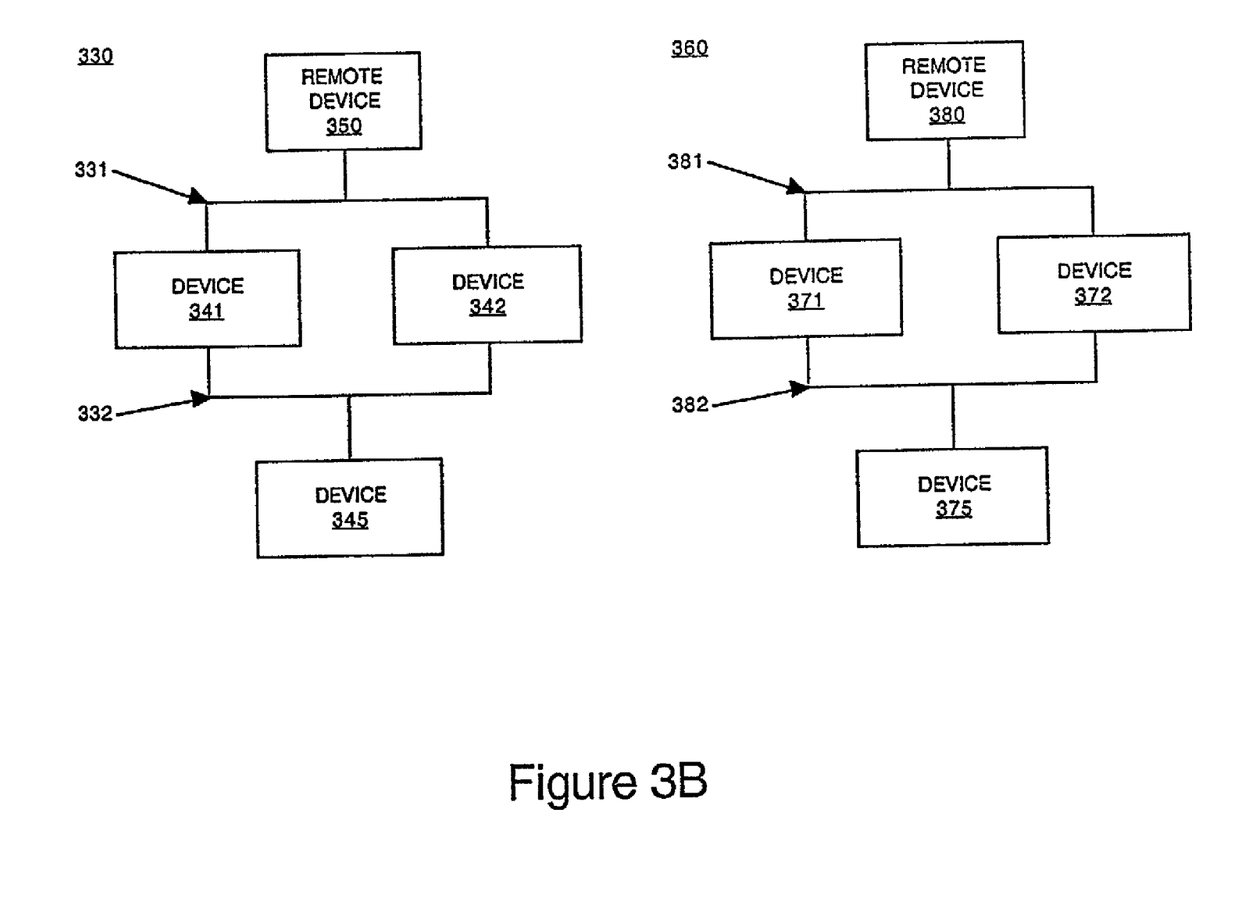
FIG. 3B is a block diagram of an exemplary network configuration for multiple remote devices in accordance with one embodiment of the present invention.

FIG. 3B is a logical block diagram of an exemplary network configuration for multiple applications 330 and 360

(e.g., multiple customers) in accordance with one embodiment of the present invention. FIG. 3B shows two network topologies 330 and 360 for hosting two customers in a data center, for example. The customers, while coexisting in the same physical environment, are isolated in separate networks. Devices 341, 342, 345, 371, 372 and 375 may be any type of networked device, such as a computer system (e.g., a server or the like).

Similar to the discussion above in conjunction with FIG. 3A, by selectively enabling and disabling intervening switches (or switch ports), remote device 350 of FIG. 3B can communicate only with devices on the first LAN comprising devices 341 and 342, which in turn can communicate with each other via actualized communication path 331 (or 332) or with device 345 via actualized communication path 332. Likewise, remote device 380 can communicate only with devices on the first LAN comprising devices 371 and 372, which in turn can communicate with each other via actualized communication path 381 (or 382) or with device 375 via actualized communication path 382.

Figure 4:
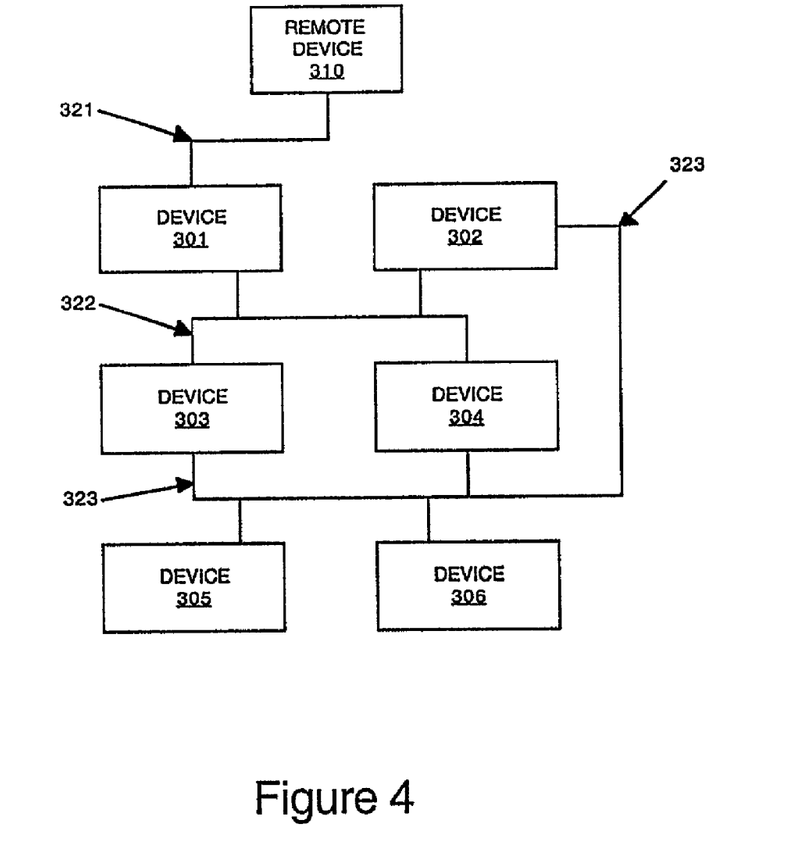
FIG. 4 is a block diagram in which the configuration of FIG. 3A has been dynamically reconfigured in accordance with one embodiment of the present invention.

FIG. 4 is a logical block diagram in which the LAN configuration of FIG. 3A has been dynamically reconfigured in accordance with one embodiment of the present invention. As mentioned above, an existing network configuration can be dynamically reconfigured by enabling and/or disabling selected switches (or switch ports). Significantly, the network is reconfigured without having to change the physical wiring of the network.

Referring to FIG. 4, intervening switches between device 302 and remote device 310 are disabled so that device 302 can no longer communicate with remote device 310 on LAN 321. Intervening switches between device 302 and devices 303 and 304 are not changed. Intervening switches between device 302 and devices 305 and 306 are enabled so that device 302 can communicate with devices 305 and 306. In essence, device 302 has been removed from the first tier (e.g., the Web tier) and added to the second tier (e.g., the application tier). As such, the role or function performed by device 302 in the network may also be changed. That is, device 302 may have performed one function of the application as a member of the Web tier, and may now perform a different function as a member of the application tier. Software and any other information required by device 302 for its new function may be pre-loaded onto device 302 in anticipation of its multi-function role, or that information may be loaded onto device 302 as part of the network reconfiguration.

The change in configuration instituted as described in the example may be initiated for a variety of reasons. In one embodiment, decisions about which devices should be provisioned for a particular application are made based on service level objectives. Thresholds based on the service level objectives can be put in place and network and/or application performance can be monitored against these thresholds. The network can be configured to improve application performance or availability or to decrease costs, depending on the service level objective.

For example, application monitoring may indicate that the Web tier is currently over-provisioned while the application tier is currently under-provisioned. That is, few customers may be accessing the network, but there may not be enough resources assigned to the execution of an application in response to the incoming customer requests. Consequently, in accordance with the present invention, the network is reconfigured to adjust the available resources, placing them where they are needed. Thus, a device in the Web tier that is being under-utilized can be placed in the application tier, where additional resources are needed. As described, this is accomplished by changing the programming of selected switches to forward network traffic differently through the network fabric (refer to FIG. 2 above), obviating the need to physically move the device or physically rewire the network.

Thus, in accordance with the present invention, devices need only be physically wired once, avoiding the types of problems associated with rewiring networks. Still, the network can be dynamically configured and reconfigured into different network topologies in support of multiple applications. Devices can be quickly added to or quickly removed from each application's LANs. Thus, there is no need to over-provision each application with extra devices to account for peak loads. Only the network as a whole must maintain adequate devices for peak loads.

Figure 5A:
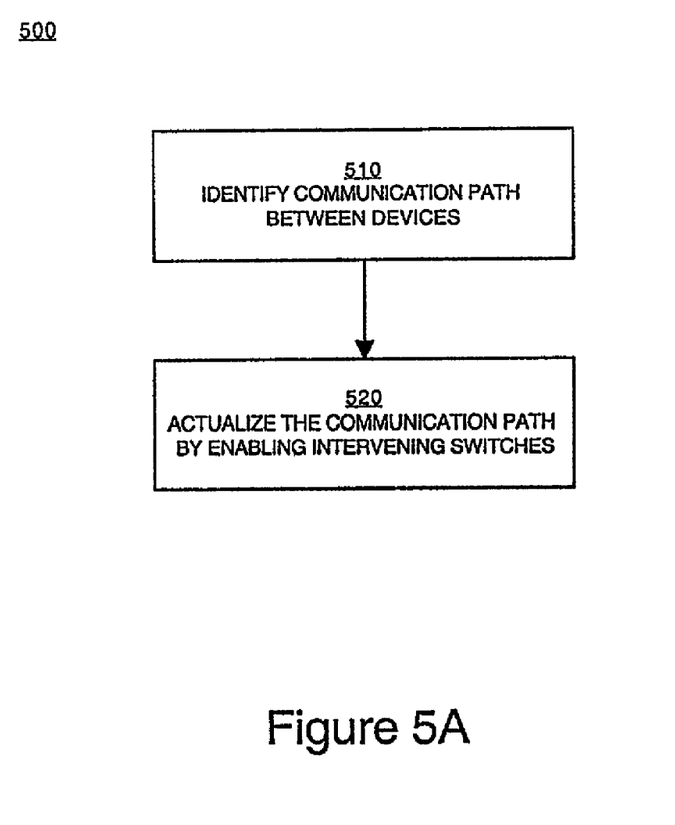
FIG. 5A is a flowchart of the steps in a process for configuring a network in accordance with one embodiment of the present invention.

FIG. 5A is a flowchart of the steps in a process 500 for configuring a network in accordance with one embodiment of the present invention. In one embodiment, process 500 is carried out by a processor (e.g., processor 104 of FIG. 1) under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1.

Using process 500 of FIG. 5A, the devices illustrated by FIG. 2 can be configured into many different network topologies using software that is executed either automatically or under the direction of a network manager or administrator. Process 500, as well as processes 600, 700 and 800 of FIGS. 5B, 6A and 6B, respectively, are used to generate programming information used to selectively enable and disable the switches 211–214 of FIG. 2 (e.g., configure the ports on the switches to enable and disable VLANs).

Although specific steps are disclosed in process 500 of FIG. 5A, such steps are exemplary. That is, the present invention is well suited to performing various other steps or variations of the steps recited in process 500. It is appreciated that the steps in process 500 may be performed in an order different than presented, and that not all of the steps in process 500 may be performed.

In step 510 of FIG. 5A, in the present embodiment, a "map" of the possible physical connections is used to identify possible communication paths between devices to be communicatively coupled. For example, referring back to FIG. 2, it is seen that devices 201 and 205 can be communicatively coupled by enabling switches 211 and 213. In step 520, the switches coupled between devices to be communicatively coupled are enabled in order to actualize a communication path between the devices. Additional information is provided with reference to FIG. 5B below.

Figure 5B:
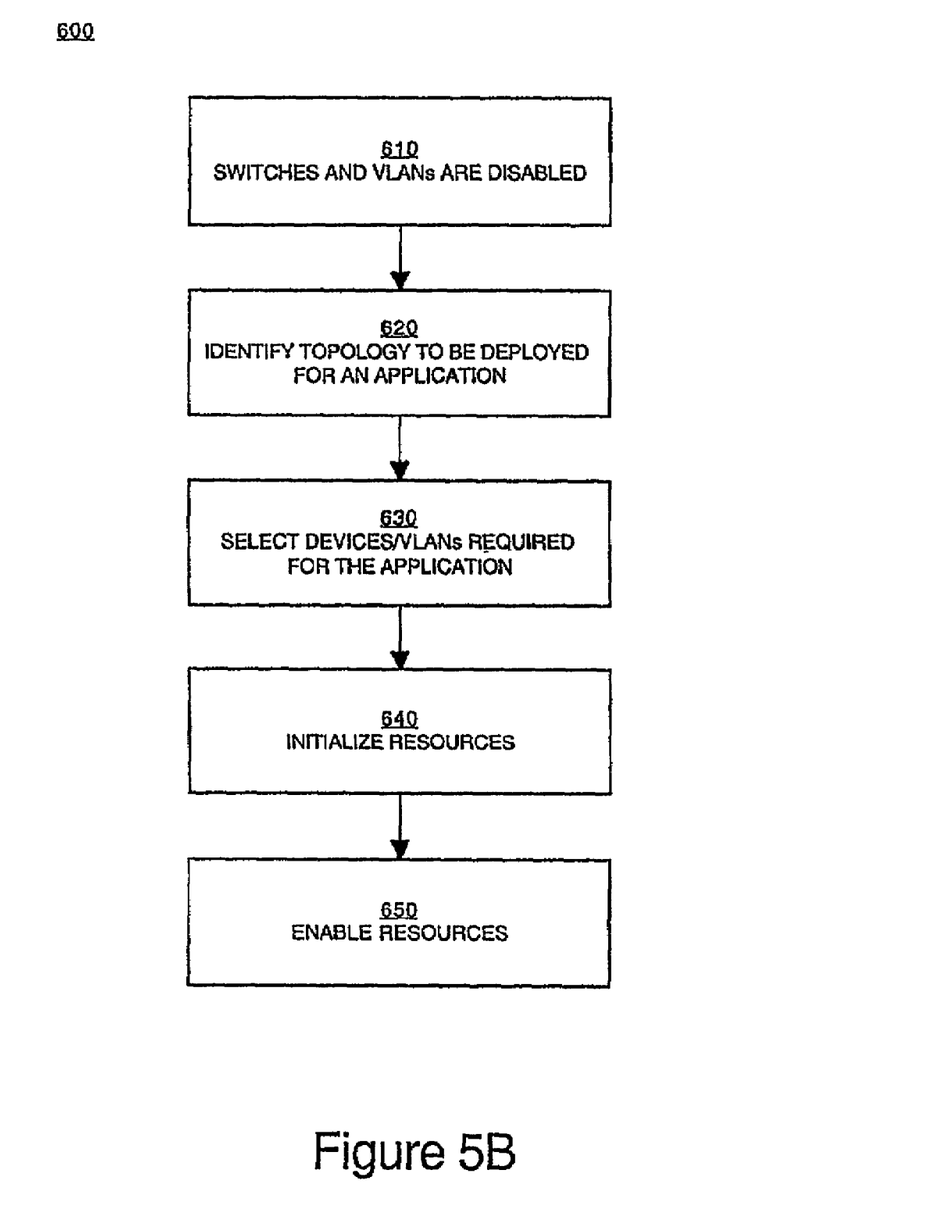
FIG. 5B is a flowchart of the steps in a process for deploying a new network topology in accordance with one embodiment of the present invention.

FIG. 5B is a flowchart of the steps in a process 600 for deploying a new network topology in accordance with one embodiment of the present invention. In one embodiment, process 600 is carried out by a processor (e.g., processor 104 of FIG. 1) under the control of computer-readable and computer-executable instructions that reside, for example, in data storage features such as computer usable volatile memory 106, computer usable non-volatile memory 108, and/or data storage device 110 of FIG. 1. Although specific steps are disclosed in process 600, such steps are exemplary.

In step 610 of FIG. 5B, in the present embodiment, all of the devices and LANs are initially disabled on the switch ports of the switches 211–214 (FIG. 2). This step is performed primarily for added security; that is, all communication paths are initially disabled so that it is necessary to actualize a desired communication path, thereby lessening the probability of there being an unauthorized or incorrect communication path.

In step 620 of FIG. 5B, in the present embodiment, the network topology that needs to be deployed (configured) for a particular network application is identified. This information describes, for instance, the types of resources (e.g., computers, firewalls, load balancers, routers, storage devices, etc.) that are needed by the application.

In step 630, in the present embodiment, the actual resources (devices) that will be used for the application are selected. As described above, these resources may be partitioned into various tiers or LANs, depending on the application. In addition, the communication paths that need to be actualized in order to allow these resources to communicate are also selected.

In step 640, in the present embodiment, the selected resources are initialized with the parameters needed for them to communicate. These parameters can include information such as Internet Protocol (IP) addresses, subnet masks, VLAN identifiers, and other like information known in the art. In addition, information and software required to execute the application are loaded onto the resources.

In step 650, in the present embodiment, the resources are enabled on selected switches (specifically, switch ports) to actualize communication paths between the resources.

Figure 6A:
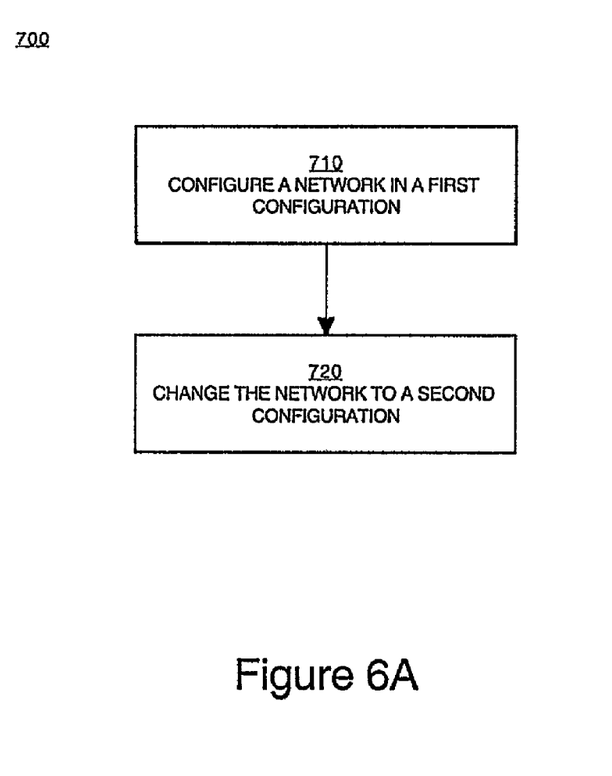
FIG. 6A is a flowchart of the steps in a process for managing a network in accordance with one embodiment of the present invention.

FIG. 6A is a flowchart of the steps in a process 700 for managing a network in accordance with one embodiment of the present invention. In one embodiment, process 700 is carried out by a processor (e.g., processor 104 of FIG. 1) under the control of computer-readable and computer-executable instructions that reside, for example, in data storage features such as computer usable volatile memory 106, computer usable non-volatile memory 108, and/or data storage device 110 of FIG. 1. Although specific steps are disclosed in process 700, such steps are exemplary.

In step 710 of FIG. 6A, in the present embodiment, a network is configured in a first configuration using a process such as that described above in conjunction with FIG. 5B. In step 720, the network is changed from the first configuration to a second configuration by enabling (actualizing) selected communication paths and/or disabling selected actualized (existing) communication paths. Additional information is provided with reference to FIG. 6B, below.

Figure 6B:
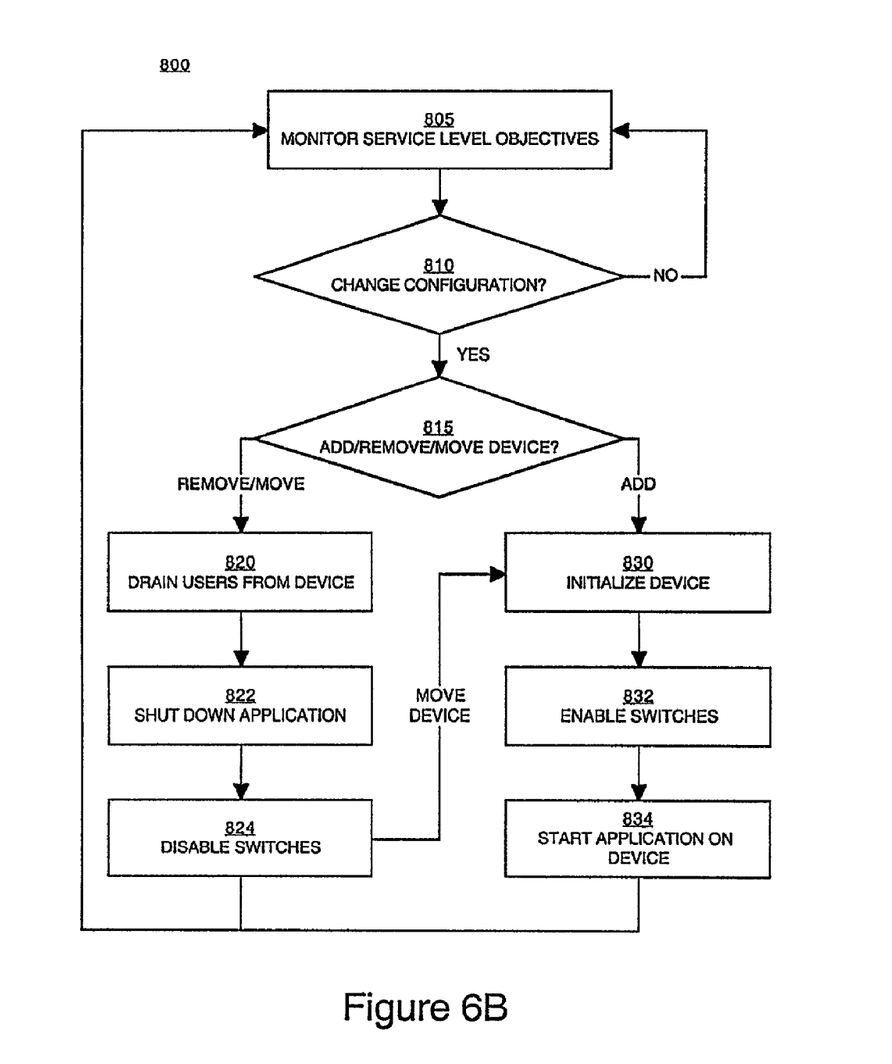
FIG. 6B is a flowchart of the steps in a process for reconfiguring a network in accordance with one embodiment of the present invention.

FIG. 6B is a flowchart of the steps in a process 800 for reconfiguring a network in accordance with one embodiment of the present invention. In one embodiment, process 800 is carried out by a processor (e.g., processor 104 of FIG. 1) under the control of computer-readable and computer-executable instructions that reside, for example, in data storage features such as computer usable volatile memory 106, computer usable non-volatile memory 108, and/or data storage device 110 of FIG. 1. Although specific steps are disclosed in process 800, such steps are exemplary.

In accordance with the present invention, process 800 can be advantageously performed without having to shut down the network. Furthermore, process 800 can be implemented automatically or under the direction of a network manager or administrator.

In step 805 of FIG. 6B, in the present embodiment, network and/or application performance is monitored to determine if any of the resources are being over-utilized or under-utilized, or if there is a bottleneck in the network. For example, an application's communication path may include ports that are over-subscribed and unable to satisfactorily manage the demands placed on it. Alternatively, network performance may be at less than optimum because loads are not evenly distributed among the resources. In one embodiment, performance metrics are monitored and compared with service level objectives to assess network and/or application performance.

In step 810, a decision is made whether a change in network configuration is necessary or desirable. In one embodiment, thresholds based on the service level objectives are defined, and if a threshold is crossed, a change in configuration may be needed. If a change in configuration is not needed, process 800 returns to step 805; otherwise, process 800 continues to step 815.

In step 815, a decision is made whether to add or remove resources from a tier, or to move a resource from one tier to another. As described above, adding, removing or moving resources does not entail physically moving a device or physical changing the wiring. Instead, in accordance with the present invention, the network is reconfigured by changing the virtual wiring of the network (e.g., by enabling and/or disabling selected switches). Process 800 proceeds to step 820 to remove or move a resource, and to step 830 to add a resource.

In step 820, in the present embodiment, users are drained from the device to be moved or removed. For example, traffic is no longer directed to that device, until all traffic to the device has ceased. In step 822, the application (or the portion of the application performed by the device) is shut down on the device. In step 824, the device is removed from the tier by disabling communication paths (disabling selected switches or switch ports) to the device.

Returning to step 830, a resource (device) is to be added to the current network configuration. The device that is added may be the device that was removed in steps 820, 822 and 824. Alternatively, the device that is added may be a device that was pre-wired to the network but was not previously in use (e.g., it was off line).

In step 830, in the present embodiment, the device being added is configured with the information and software that will allow it to communicate with other devices on the LAN. In addition, information and software required to execute the application are loaded onto the device. In step 832, selected switches are enabled to allow the device to communicate with other network devices on the LAN or LANs. In step 834, the application is started on the device, and the device is added to the new tier.

In summary, the present invention provides a method and system that can overcome the need for rewiring networks when resources are added to the networks or when the networks are reconfigured. The present invention also provides a method and system that can quickly allocate resources where they may be needed.

The present invention has been described in the context of LANs, VLANs, and multi-tiered applications. However, it is understood that the concept of the present invention can be used to provide traffic isolation and partitioning in other types of networks and applications.

The preferred embodiment of the present invention, network topology manager, is thus described. While the present invention has been described in particular embodiments, it should be appreciated that the present invention should not be construed as limited by such embodiments, but rather construed according to the following claims.

What is claimed is:

1. A network comprising:
    a plurality of interconnected switches, wherein said switches are programmable to selectively forward instances of network traffic; and a plurality of devices coupled to said plurality of interconnected switches, wherein a network interface of a device is physically wired to a switch;

wherein said devices are organized in multiple tiers, wherein a communication path from a first tier to a second tier is actualized by enabling intervening switches to forward an instance of network traffic from said first tier to said second tier, wherein an instance of network traffic sent from said first tier and intended for said second tier is forwarded by said intervening switches only to said second tier; and wherein said device is removed as a member of said first tier and made a member of said second tier by selectively disabling actualized communication paths to said device and enabling new communication paths to said device with said device remaining physically wired to said switch.

2. The network of claim 1 wherein said switch comprises multiple switch ports, wherein said device is physically wired to a single switch port and wherein said switch is couplable to multiple devices.

3. The network of claim 1 wherein said device comprises multiple network interfaces, wherein each network interface is coupled to ports on said same switch.

4. The network of claim 1 wherein said device comprises multiple network interfaces, wherein each network interface is coupled to ports on more than one switch.

5. The network of claim 1 wherein communication between intervening switches is implemented using a data-link layer protocol corresponding to Layer 2 of the OSI (Open Systems Interconnection) model.

6. The network of claim 1 wherein communication paths between said devices are created substantially in compliance with IEEE 802.1Q.

7. The network of claim 1 wherein said devices are organized in a plurality of local area networks (LANs), wherein said first tier comprises a first LAN and said second tier comprises a second LAN.

8. The network of claim 1 wherein communication paths between said devices are dynamically changeable.

9. The network of claim 1 wherein said device is a multi-functional device, wherein a first communication path to said multi-functional device is actualized for a first function and a second communication path to said multi-functional device is actualized for a second function.

10. A method for configuring a network comprising a plurality of devices coupled to a plurality of interconnected switches, said method comprising:

identifying a communication path between a first tier of said network and a second tier of said network, said communication path comprising intervening switches coupled between said first and second tiers, wherein a device is physically wired to a switch as a member of said first tier; and actualizing said communication path by enabling said intervening switches to forward network traffic from said first tier to said second tier, wherein an instance of network traffic sent from said first tier and intended for said second tier is forwarded by said intervening switches only to said second tier;

disabling selected actualized communication paths to said device to remove said device as said member of said first tier; and enabling a new communication path to said device to make said device a member of said second tier with said device remaining physically wired to the same said switch.

11. The method as recited in claim 10 wherein said switch comprises multiple switch ports, wherein said device is coupled to a single switch port and wherein said switch is couplable to multiple devices.

12. The method as recited in claim 10 wherein said device comprises multiple network interfaces, wherein each network interface is coupled to ports on said same switch.

13. The method as recited in claim 10 wherein said device comprises multiple network interfaces, wherein each network interface is coupled to ports on more than one switch.

14. The method as recited in claim 10 wherein communication between intervening switches is implemented using a data-link layer protocol corresponding to Layer 2 of the OSI (Open Systems Interconnection) model.

15. The method as recited in claim 10 wherein communication paths between said devices are created substantially in compliance with IEEE 802.1Q.

16. The method as recited in claim 10 wherein said devices are organized in a plurality of local area networks (LANs), wherein said first tier comprises a first LAN and said second tier comprises a second LAN.

17. The method as recited in claim 10 wherein communication paths between said devices are dynamically changeable.

18. The method as recited in claim 10 further comprising enabling and disabling selected communication paths to a multi-functional device according to a function being performed by said multi-functional device.

19. A method for managing a network comprising a plurality of devices coupled to a plurality of interconnected switches, said method comprising:

configuring said network in a first configuration comprising a first set of actualized communication paths between a first tier of said network and a second tier of said network, wherein said first tier includes a device having a network interface that is physically wired to a switch, wherein instances of network traffic are selectively forwarded through said network by programming said switches, wherein a communication path between said first and second tiers is actualized by enabling intervening switches to forward network traffic between said first and second tiers, wherein an instance of network traffic intended for a particular tier is forwarded only to said particular tier and wherein network traffic is not forwarded between tiers not communicatively coupled by an actualized communication path; and changing said network to a second configuration comprising a second set of actualized communication paths different from said first set, wherein said changing comprises selectively disabling actualized communication paths and enabling new communication paths, wherein said device is removed as a member of said first tier and made a member of said second tier without rewiring the physical wiring between said network interface and said switch.

20. The method as recited in claim 19 comprising monitoring network performance against a threshold, wherein said changing is implemented when said threshold level is crossed.

21. The method as recited in claim 19 comprising monitoring application performance against a threshold, wherein said changing is implemented when said threshold is crossed.

22. The method as recited in claim 19 wherein a switch comprises multiple switch ports, wherein said device is coupled to a single switch port and wherein said switch is couplable to multiple devices.

23. The method as recited in claim 19 wherein said device comprises multiple network interfaces, wherein each network interface is coupled to ports on a same switch.

24. The method as recited in claim 19 wherein said device comprises multiple network interfaces, wherein each network interface is coupled to ports on more than one switch.

25. The method as recited in claim 19 wherein communication between intervening switches is implemented using a data-link layer protocol corresponding to Layer 2 of the OSI (Open Systems Interconnection) model.

26. The method as recited in claim 19 wherein communication paths between devices are created substantially in compliance with IEEE 802.1Q.

27. The method as recited in claim 19 wherein said devices are organized in a plurality of local area networks (LANs), wherein said first tier comprises a first LAN and said second tier comprises a second LAN.

28. The method as recited in claim 19 wherein said changing further comprises enabling and disabling selected communication paths to a multi-functional device according to a function being performed by said multi-functional device.

* * * * *